US011326129B2

(12) United States Patent
Fossum et al.

(10) Patent No.: US 11,326,129 B2
(45) Date of Patent: May 10, 2022

(54) FABRIC CARE COMPOSITIONS THAT INCLUDE A GRAFT COPOLYMER AND RELATED METHODS

(71) Applicant: The Procter & Gamble Company, Cincinnati, OH (US)

(72) Inventors: Renae Dianna Fossum, Middletown, OH (US); Lidiany Gonzalez, West Chester, OH (US); Elaine Marie Burt, Cincinnati, OH (US); Jan Ole Mueller, Ludwigshafen (DE); Dieter Hannu Boeckh, Limburgerhof (DE); Dawid Marczewski, Limburgerhof (DE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 16/018,235

(22) Filed: Jun. 26, 2018

(65) Prior Publication Data
US 2019/0390142 A1 Dec. 26, 2019

(51) Int. Cl.
C11D 3/37 (2006.01)
C11D 3/386 (2006.01)
C11D 3/42 (2006.01)
C11D 11/00 (2006.01)

(52) U.S. Cl.
CPC .......... C11D 3/3788 (2013.01); C11D 3/3707 (2013.01); C11D 3/3757 (2013.01); C11D 3/3776 (2013.01); C11D 3/386 (2013.01); C11D 3/42 (2013.01); C11D 11/0017 (2013.01)

(58) Field of Classification Search
CPC . C11D 3/3788; C11D 3/3707; C11D 11/0017; C11D 3/42; C11D 3/386; C11D 3/3776; C11D 3/3757
See application file for complete search history.

(56) References Cited

U.S. PATENT DOCUMENTS

| 4,464,281 | A | * | 8/1984 | Rapisarda | C11D 3/395 510/220 |
| 4,746,456 | A | * | 5/1988 | Kud | C11D 3/3788 510/309 |
| 4,846,995 | A | | 7/1989 | Kud et al. | |
| 4,904,408 | A | * | 2/1990 | Kud | C11D 3/0036 510/316 |
| 5,049,302 | A | * | 9/1991 | Holland | C11D 1/83 510/299 |
| 8,143,209 | B2 | * | 3/2012 | Boeckh | C11D 3/3788 510/351 |
| 8,247,368 | B2 | | 8/2012 | Danziger | |
| 8,716,208 | B2 | | 5/2014 | Meek | |
| 8,859,484 | B2 | | 10/2014 | Hulskotter | |
| 9,528,076 | B2 | | 12/2016 | Labeque | |
| 2003/0186833 | A1 | * | 10/2003 | Huff | C08F 283/06 510/475 |
| 2006/0270582 | A1 | * | 11/2006 | Boeckh | C11D 3/3788 510/386 |
| 2007/0281879 | A1 | * | 12/2007 | Sharma | C11D 3/3788 510/475 |
| 2008/0045441 | A1 | * | 2/2008 | Schmiedel | C11D 1/721 510/514 |
| 2008/0300158 | A1 | * | 12/2008 | Schutz | C11D 3/3723 510/218 |
| 2010/0004154 | A1 | | 1/2010 | Detering | |
| 2010/0144958 | A1 | | 6/2010 | Findlay | |
| 2010/0197550 | A1 | * | 8/2010 | Bettiol | C11D 3/0089 510/236 |
| 2013/0150277 | A1 | | 6/2013 | Fischer | |
| 2015/0111285 | A1 | * | 4/2015 | Raja Abdul Rahman | C11D 3/225 435/264 |
| 2015/0203796 | A1 | * | 7/2015 | Miracle | C11D 3/386 510/295 |

FOREIGN PATENT DOCUMENTS

| EP | 0285038 A2 | 10/1988 |
| EP | 0330345 B1 | 5/1995 |
| EP | 3330345 A1 | 6/2018 |

OTHER PUBLICATIONS

15288 PCT Search Report and Written Opinion for PCT/US2019/035493 dated Aug. 14, 2019, 15 pages.

* cited by examiner

Primary Examiner — Mark Kopec
Assistant Examiner — Jaison P Thomas
(74) Attorney, Agent, or Firm — Carrie Schwartz

(57) ABSTRACT

Fabric care compositions that include a graft copolymer, which may include (a) a polyalkylene oxide, such as polyethylene oxide (PEG); (b) N-vinylpyrrolidone (VP); and (c) a vinyl ester, such as vinyl acetate. Methods and uses relating to such compositions and/or graft copolymers.

22 Claims, No Drawings

FABRIC CARE COMPOSITIONS THAT INCLUDE A GRAFT COPOLYMER AND RELATED METHODS

FIELD OF THE INVENTION

The present disclosure relates to compositions, such as fabric care compositions, that include a graft copolymer. The present disclosure also relates to methods and uses relating to such compositions and/or graft copolymers.

BACKGROUND OF THE INVENTION

When laundering fabrics, dye transfer can cause challenges. For example, dye from one portion of a fabric may become suspended in a wash liquor and may then deposit on a different portion of the fabric, or on a different fabric altogether. Transfer of such dyes (known as "fugitive dyes") can cause graying of fabrics, especially of those of a light or white color.

Certain polymers, generally known as dye transfer inhibitor ("DTI") polymers, have traditionally been used in laundry compositions to address the dye transfer problem. Such polymers include polyvinyl pyrrolidone (PVP), poly(vinylpyrine-N-oxide) (PVNO), polyvinylpyrrolidone-co-polyvinylimidazole (PVP/PVI), and poly(vinylpyrrolidone) co-poly(vinylpyridine-N-oxide) (PVP/PVNO) polymers, which have typically included relatively high levels of vinyl pyrrolidone ("VP"). These traditional DTI polymers are quite effective at inhibiting the transfer of direct dyes, which are dyes that are used to dye cellulosic fibers, and are known to have poor wash fastness resulting in dye bleeding during the wash process. Without wishing to be bound by theory, direct dyes are attached to cellulosic fibers via very weak hydrogen bonding as well as van der Waals forces, and can bleed during the wash process, and traditional DTI polymers suspend the released dye decreasing the dye transfer that occurs on fabric.

However, over time, the textile industry has shifted away from direct dyes in favor of reactive dyes, which are dyes that are covalently bound to the cellulose fiber that result in much better wash fastness than the direct dyes that results in better color retention on the fabric. Without wishing to be bound by theory, it is believed that although generally substantive to fabrics, the reactive dyes can hydrolyze during the application process and remain in the fabric, from which the hydrolyzed products can be released into a wash liquor. As much as 50% hydrolysis can occur during the dyeing process, resulting in hydrolyzed products that are slowly released over successive washing cycles. Thus, there remains a problem of fugitive dye transfer during the wash.

It is believed that the traditional DTI polymers are less effective on hydrolyzed reactive dyes. Additionally or alternatively, traditional DTI polymers can lead to stability challenges in combination with other laundry adjuncts, such as optical brighteners. Thus, particularly as direct dyes have become less prevalent in typical laundry loads, traditional DTI polymers are only effective on a small portion of the garments in the wash load, and consumers continue to have a problem with dye transfer even with detergents that contain traditional DTI polymers. This challenge may be made even more acute by the laundry practices of the modern consumer, including larger loads that tend to have mixed fabric types and colors (e.g., under-sorted loads).

Therefore, there remains a need for improved, stable laundry compositions and related processes that can inhibit dye transfer, particularly transfer of hydrolyzed reactive dyes.

SUMMARY OF THE INVENTION

The present disclosure relates to compositions that include a graft copolymer.

For example, the present disclosure relates to a composition comprising a graft copolymer and a treatment adjunct, the graft copolymer including: (a) a polyalkylene oxide that has a number average molecular weight of from about 1000 to about 20,000 Daltons and is based on ethylene oxide, propylene oxide, or butylene oxide, (b) N-vinylpyrrolidone, and (c) vinyl ester derived from a saturated monocarboxylic acid containing from 1 to 6 carbon atoms and/or a methyl or ethyl ester of acrylic or methacrylic acid, where the weight ratio of (a):(b) is from about 1:0.1 to about 1:1, where the amount, by weight, of (a) is greater than the amount of (c), the order of the addition of monomers (b) and (c) in the graft polymerization being immaterial, and where the composition is a fabric care composition.

The present disclosure also relates to a composition including a graft copolymer and a treatment adjunct, the graft polymer including (a) an alkylene oxide that has a number average molecular weight of from about 1000 to 20,000 Daltons, the alkylene oxide being based on ethylene oxide, propylene oxide, or butylene oxide, (b) N-vinylpyrrolidone, and (c) vinyl acetate or a derivative thereof, the order of the addition of monomers (b) and (c) in the graft polymerization being immaterial, the treatment adjunct further including a stilbene brightener, a hueing agent, a protease enzyme, a structurant, or mixtures thereof; where the composition is a fabric care composition.

The present disclosure also relates to a process of treating a fabric, the process comprising the steps of: providing a fabric, and contacting the fabric with a composition according to any previous claim, optionally in the presence of water.

The present disclosure also relates to a use of a graft co-polymer as a dye transfer inhibitor in a fabric care composition, preferably where the dye is a reactive dye, more preferably a hydrolyzed reactive dye, where the graft copolymer includes (a) a polyalkylene oxide which has a number average molecular weight of from about 1000 to about 20,000 Daltons and is based on ethylene oxide, propylene oxide, or butylene oxide, preferably based on ethylene oxide, (b) N-vinylpyrrolidone, and (c) vinyl ester derived from a saturated monocarboxylic acid containing from 1 to 6 carbon atoms and/or a methyl or ethyl ester of acrylic or methacrylic acid, preferably a vinyl ester that is vinyl acetate or a derivative thereof, where the weight ratio of (a):(b) is from about 1:0.1 to about 1:1, where the amount, by weight, of (a) is greater than the amount of (c), the order of the addition of monomers (b) and (c) in the graft polymerization being immaterial.

DETAILED DESCRIPTION OF THE INVENTION

The present disclosure relates to fabric care compositions that include a particular graft copolymer that may be useful for dye transfer inhibition (also known as dye control), and related processes.

The graft copolymers of the present disclosure may be formed from at least three monomers or structural units: (a)

a polyalkylene oxide, such as polyethylene oxide (PEG), which may serve as a graft base; (b) N-vinylpyrrolidone (VP); and (c) a vinyl ester, such as vinyl acetate. Without wishing to be bound by theory, it is believed that by carefully selecting the relative amounts and/or molecular weights of the monomers of the graft copolymers in accordance with the present disclosure, a fabric care composition that includes such graft copolymers may provide improved dye control during fabric treatment processes, such as wash or rinse cycles.

Additionally or alternatively, it has been found that fabric care compositions that include graft copolymers according to the present disclosure in combination with certain treatment adjuncts are surprisingly effective and/or stable.

Compositions that include the graft copolymers, and related processes, are discussed in more detail below.

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

As used herein the phrase "fabric care composition" includes compositions and formulations designed for treating fabric. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

In all embodiments of the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Composition

The compositions of the present disclosure may be fabric care compositions. Such compositions may be used as a pre-laundering treatment, a post-laundering treatment, or may be added during the rinse or wash cycle of the laundering operation.

The composition may be selected from the group of light duty liquid detergents compositions, heavy duty liquid detergent compositions, detergent gels commonly used for laundry, bleaching compositions, laundry additives, fabric enhancer compositions, and mixtures thereof. The composition may be a heavy duty liquid detergent composition.

The composition may be in any suitable form. The composition may be in the form of a liquid composition, a granular composition, a single-compartment pouch, a multi-compartment pouch, a sheet, a pastille or bead, a fibrous article, a tablet, a bar, flake, or a mixture thereof. The composition can be selected from a liquid, solid, or combination thereof.

As used herein, "liquid" includes free-flowing liquids, as well as pastes, gels, foams and mousses. Non-limiting examples of liquids include light duty and heavy duty liquid detergent compositions, fabric enhancers, detergent gels commonly used for laundry, bleach and laundry additives. Gases, e.g., suspended bubbles, or solids, e.g. particles, may be included within the liquids. A "solid" as used herein includes, but is not limited to, powders, agglomerates, and mixtures thereof. Non-limiting examples of solids include: granules, micro-capsules, beads, noodles, and pearlised balls.

The cleaning composition may be in the form of a unitized dose article, such as a tablet, a pouch, a sheet, or a fibrous article. Such pouches typically include a water-soluble film, such as a polyvinyl alcohol water-soluble film, that at least partially encapsulates a composition. Suitable films are available from MonoSol, LLC (Indiana, USA). The composition can be encapsulated in a single or multi-compartment pouch. A multi-compartment pouch may have at least two, at least three, or at least four compartments. A multi-compartmented pouch may include compartments that are side-by-side and/or superposed. The composition contained in the pouch or compartments thereof may be liquid, solid (such as powders), or combinations thereof.

The compositions of the present disclosure may include a graft copolymer and one or more treatment adjuncts, as described in more detail below.

Graft Copolymer

The compositions and methods of the present disclosure relate to a graft polymer. Broadly, the graft polymer may comprise and/or be obtainable by grafting (a) a polyalklyene oxide with (b) N-vinylpyrrolidone and (c) a vinyl ester. The graft polymer is described in more detail below.

Compositions according to the present disclosure may include from about 0.1% to about 50%, or to about 40%, or to about 25%, or from about 0.1% to about 15%, or from about 0.1% to about 10%, or from about 0.2% to about 5%, by weight of the composition, of the graft polymer. The graft polymer may be present in an aqueous treatment liquor, such as a wash liquor or a rinse liquor of an automatic washing machine, in an amount of about 5 ppm, or from about 10 ppm, or from about 25 ppm, or from about 50 ppm, to about 1500 ppm, or to about 1000 ppm, or to about 500 ppm, or to about 250 ppm.

The graft polymer may be comprise and/or be obtainable by grafting (a) a polyalkylene oxide which has a number average molecular weight of from about 1000 to about 20,000, or to about 15,000, or to about 12,000, or to about 10,000 Daltons and is based on ethylene oxide, propylene oxide, or butylene oxide, preferably based on ethylene oxide, with (b) N-vinylpyrrolidone, and further with (c) a vinyl ester derived from a saturated monocarboxylic acid containing from 1 to 6 carbon atoms and/or a methyl or ethyl ester of acrylic or methacrylic acid, preferably a vinyl ester that is vinyl acetate or a derivative thereof; where the weight ratio of (a):(b) is from about 1:0.1 to about 1:1; where the amount, by weight, of (a) is greater than the amount of (c); and where the order of the addition of monomers (b) and (c) in the graft polymerization is immaterial.

The graft polymer may comprise and/or be obtainable by grafting (a) an alkylene oxide which has a number average molecular weight of from about 1000 to 20,000, or to about 15,000, or to about 12,000, or to about 10,000 Daltons, the alkylene oxide being based on ethylene oxide, with (b) N-vinylpyrrolidone, and (c) vinyl acetate or a derivative thereof; wherein the weight ratio of (a):(b) is from about 1:0.1 to about 1:2, or to about 1:1; wherein the weight ratio of (b):(c) is from about 1:0.1 to about 1:5, or to about 1:4; wherein the weight ratio of (a):(c) is from about 1:0.1 to about 1:5, or to about 1:3; the order of the addition of monomers (b) and (c) in the graft polymerization being immaterial.

The graft polymer may be obtainable by grafting (a) an alkylene oxide which has a number average molecular weight of from about 1000 to 20,000, or to about 15,000, or to about 12,000, or to about 10,000 Daltons, the alkylene oxide being based on ethylene oxide, with (b) N-vinylpyrrolidone, and (c) vinyl acetate or a derivative thereof, the order of the addition of monomers (b) and (c) in the graft polymerization being immaterial, wherein the number of grafting sites is less than 1 per 50 ethylene oxide groups, wherein the composition is a fabric care composition.

The graft bases used may be the polyalkylene oxides specified above under (a). The polyalkylene oxides of component (a) may have a number average molecular weight of about 300, or from about 1000, or from about 2000, or from about 3,000, to about 20,000, or to about 15,000, or to about 12,000, or to about 10,000, or to about 8,000, or to about 6,000 Daltons (Da). Without wishing to be bound by theory, it is believed that if the molecular weight of component (a) (e.g., polyethylene glycol), is relatively low, there may be a performance decrease in dye transfer inhibition. Additionally or alternatively, when the molecular weight is too high, the polymer may not remain suspended in solution and/or may deposit on treated fabrics.

The polyalkylene oxides may be based on ethylene oxide, propylene oxide, butylene oxides, or mixtures thereof, preferably ethylene oxide. The polyalkylene oxides may be based on homopolymers of ethylene oxide or ethylene oxide copolymers having an ethylene oxide content of from about 40 to about 99 mole %. Suitable comonomers for such copolymers may include propylene oxide, n-butylene oxide, and/or isobutylene oxide. Suitable copolymers may include copolymers of ethylene oxide and propylene oxide, copolymers of ethylene oxide and butylene oxide, and/or copolymers of ethylene oxide, propylene oxide, and at least one butylene oxide. The copolymers may include an ethylene oxide content of from about 40 to about 99 mole %, a propylene oxide content of from about 1 to about 60 mole %, and a butylene oxide content of from about 1 to about 30 mole %. The graft base may be linear (straight-chain) or branched, for example a branched homopolymer and/or a branched copolymer.

Branched copolymers may be prepared by addition of ethylene oxide with or without propylene oxides and/or butylene oxides onto polyhydric low molecular weight alcohols, for example trimethylol propane, pentoses, or hexoses. The alkylene oxide unit may be randomly distributed in the polymer or be present therein as blocks.

The polyalkylene oxides of component (a) may be the corresponding polyalkylene glycols in free form, i.e, with OH end groups, or they may be capped at one or both end groups. Suitable end groups may be, for example, C1-C25-alkyl, phenyl, and C1-C14-alkylphenyl groups. The end group may be a C1-alkyl (e.g., methyl) group. Suitable materials for the graft base may include PEG 300, PEG 1000, PEG 2000, PEG 4000, PEG 6000, PEG 8000, and/or PEG 10,000 which are polyethylene glycols, and/or MPEG 2000, MPEG 4000, MPEG 6000, MPEG 8000 and MEG 10000 which are monomethoxypolyethylene glycols that are commercially available from BASF under the tradename Pluriol®.

The polyalkylene oxides may be grafted with N-vinylpyrrolidone as the monomer of component (b). Without wishing to be bound by theory, it is believed that the presence of the N-vinylpyrrolidone ("VP") monomer in the graft polymers according to the present disclosure provides water-solubility and good film-forming properties compared to otherwise-similar polymers that do not contain the VP monomer. The vinyl pyrrolidone repeat unit has amphiphilic character with a polar amide group that can form a dipole, and a non-polar portion with the methylene groups in the backbone and the ring, making it hydrophobic. When the vinyl pyrrolidone content is too high, there may be negative interactions with other ingredients in the detergent such as brightener causing physical instability, and material cost is high with high vinyl pyrrolidone content.

The polyalkylene oxides may be grafted with a vinyl ester as the monomer of component (c). The vinyl ester may be derived from a saturated monocarboxylic acid, which may contain 1 to 6 carbon atoms, or from 1 to 3 carbon atoms, or from 1 to 2 carbon atoms, or 1 carbon atom. The vinyl ester may be derived from methyl acrylate, ethyl acrylate, methyl methacrylate, ethyl methacrylate, or mixtures thereof. Suitable vinyl esters may include vinyl formate, vinyl acetate, vinyl propionate, vinyl butyrate, vinyl valerate, vinyl isovalerate, vinyl caproate, or mixtures thereof. Preferred monomers of component (c) include vinyl acetate, vinyl propionate, methyl acrylate, mixtures of vinyl acetate and methyl acrylate, or mixtures thereof, preferably vinyl acetate. The monomers of the graft polymer, e.g., components (a), (b), and/or (c), may be present in certain ratios, such as weight ratios and/or mole ratios.

For example, the weight ratio of (a):(b) may be from about 1:0.1 to about 1:1, or from about 1:0.2 to about 1:0.7. The weight ratio of (a):(b) may be from about 1:0.1 to about 1:2, or to about 1:1. When the VP ratio is too high, the polymer may form negative interactions with other detergent ingredients such as brightener, and/or may not work sufficiently on some hydrolyzed reactive dyes.

The weight ratio of (a):(c) may be greater than 1:1, or from about 1:0.1 to about 1:0.8, or from about 1:0.2 to about 1:0.6. The weight ratio of (a):(c) is from about 1:0.1 to about 1:5, or to about 1:3. The amount, by weight, of (a) may be greater than the amount of (c). Without wishing to be bound by theory, it is believed that relatively high levels of component (c) (e.g., vinyl acetate), particularly in relation to component (a), may result in decreased performance of dye transfer inhibition and/or relatively greater hydrophobicity, which can lead to formulation and/or stability challenges.

The weight ratio of (b):(c) may be from about 1:0.1 to about 1:5, or to about 1:4. Without wishing to be bound by theory, a ratio of VP-to-VAc that is too high may lead to treated fabric having a negative feel. Additionally, negative interactions with ingredients such as brighteners may occur.

The graft polymers of the present disclosure may be characterized by relatively low degree of branching (i.e., degree of grafting). In the graft polymers of the present disclosure, the average number of grafting sites may be less than or equal to 1, or less than or equal to 0.8, or less than or equal to 0.6, or less than or equal to 0.5, or less than or equal to 0.4, per 50 alkylene oxide groups, e.g., ethylene oxide groups. The graft polymers may comprise, on average, based on the reaction mixture obtained, at least 0.05, or at least 0.1, graft site per 50 alkylene oxide groups, e.g., ethylene oxide groups. The degree of branching may be determined, for example, by means of $^{13}$C NMR spectroscopy from the integrals of the signals of the graft sites and the —CH$_2$-groups of the polyakylene oxide. The number of grafting sites may be adjusted by manipulating the temperature and/or the feed rate of the monomers. For example, the polymerization may be carried out in such a way that an excess of component (a) and the formed graft polymer is constantly present in the reactor. For example, the quantitative molar ratio of component (a) and polymer to ungrafted monomer (and initiator, if any) is generally greater than or equal to about 10:1, or to about 15:1, or to about 20:1.

The graft polymers of the present disclosure may be characterized by a relatively narrow molar mass distribution. For example, the graft polymers may be characterized by a polydispersity $M_w/M_n$ of less than or equal to about 3, or less than or equal to about 2.5, or less than or equal to about 2.3. The polydispersity of the graft polymers may be from about 1.5 to about 2.2. The polydispersity may be determined by gel permeation chromatography using narrow-distribution polymethyl methacrylates as the standard.

The graft polymers may be prepared by grafting the suitable polyalkylene oxides of component (a) with the monomers of component (b) in the presence of free radical initiators and/or by the action of high-energy radiation, which may include the action of high-energy electrons. This may be done, for example, by dissolving the polyalkylene oxide in at least one monomer of group (b), adding a polymerization initiator and polymerizing the mixture to completion. The graft polymerization may also be carried out semicontinuously by first introducing a portion, for example 10%, of the mixture of polyalkylene oxide to be polymerized, at least one monomer of group (b) and/or (c) and initiator, heating to polymerization temperature and, after the polymerization has started, adding the remainder of the mixture to be polymerized at a rate commensurate with the rate of polymerization. The graft polymers may also be obtained by introducing the polyalkylene oxides of group (a) into a reactor, heating to the polymerization temperature, and adding at least one monomer of group (b) and/or (c) and polymerization initiator, either all at once, a little at a time, or uninterruptedly, preferably uninterruptedly, and polymerizing.

In the preparation of the graft polymers, the order in which the monomers (b) and (c) are grafted onto component (a) may be immaterial and/or freely chooseable. For example, first N-vinylpyrrolidone may be grafted onto component (a), and then a monomer (c) or a mixture of monomers of group (c). It is also possible to first graft the monomers of group (c) and then N-vinylpyrrolidone onto the graft base (a). It may be that a monomer mixture of (b) and (c) are grafted onto graft base (a) in one step. The graft polymer may be prepared by providing graft base (a) and then first grafting N-vinylpyrrolidone and then vinyl acetate onto the graft base.

Any suitable polymerization initiator(s) may be used, which may include organic peroxides such as diacetyl peroxide, dibenzoyl peroxide, succinyl peroxide, di-tert-butyl peroxide, tert-butyl perbenzoate, tert-butyl perpivalate, tert-butyl permaleate, cumene hydroperoxide, diisopropyl peroxodicarbamate, bis(o-toluoyl) peroxide, didecanoyl peroxide, dioctanoyl peroxide, dilauroyl peroxide, tert-butyl perisobutyrate, tert-butyl peracetate, di-tert-amyl peroxide, tert-butyl peracetate, di-tert-amyl peroxide, tert-butyl hydroperoxide, mixtures thereof, redox initiators, and/or azo starters. The choice of initiator may be related to the choice of polymerization temperature.

The graft polymerization may take place at from about 50° C. to about 200° C., or from about 70° C. to about 140° C. The graft polymerization may typically be carried out under atmospheric pressure, but may also be carried out under reduced or superatmospheric pressure.

The graft polymerization may be carried out in a solvent. Suitable solvents may include: monohydric alcohols, such as ethanol, propanols, and/or butanols; polyhydric alcohols, such as ethylene glycol and/or propylene glycol; alkylene glycol ethers, such as ethylene glycol monomethyl and -ethyl ether and/or propylene glycol monomethyl and -ethyl ether; polyalkylene glycols, such as di- or tri-ethylene glycol and/or di- or tri-propylene glycol; polyalkylene glycol monoethers, such as poly(C2-C3-alkylene)glycol mono (C1-C16-alkyl)ethers having 3-20 alkylene glycol units; carboxylic esters, such as ethyl acetate and ethyl propionate; aliphatic ketones, such as acetone and/or cyclohexanone; cyclic ethers, such as tetrahydrofuran and/or dioxane; or mixtures thereof.

The graft polymerization may also be carried out in water as solvent. In such cases, the first step may be to introduce a solution which, depending on the amount of added monomers of component (b) is more or less soluble in water. To transfer water-insoluble products that can form during the polymerization into solution, it is possible, for example, to add organic solvents, for example monohydric alcohols having 1 to 3 carbon atoms, acetone, and/or dimethylformamide. In a graft polymerization process in water, it is also possible to transfer the water-insoluble graft polymers into a finely divided dispersion by adding customary emulsifiers or protective colloids, for example polyvinyl alcohol. The emulsifiers used may be ionic or nonionic surfactants whose HLB value is from about 3 to about 13. HLB value is determined according to the method described in the paper by W. C. Griffin in J. Soc. Cosmet. Chem. 5 (1954), 249.

The amount of surfactant used in the graft polymerization process may be from about 0.1 to about 5% by weight of the graft polymer. If water is used as the solvent, solutions or dispersions of graft polymers may be obtained. If solutions of graft polymers are prepared in an organic solvent or in mixtures of an organic solvent and water, the amount of organic solvent or solvent mixture used per 100 parts by weight of the graft polymer may be from about 5 to about 200, preferably from about 10 to about 100, parts by weight.

The graft polymers may have a K value of from about 5 to about 200, preferably from about 5 to about 50, determined according to H. Fikentscher in 2% strength by weight solution in dimethylformamide at 25 C.

After the graft polymerization, the graft polymer may optionally be subjected to a partial hydrolysis. The graft polymer may include up to 60 mole %, or up to 50 mole %, or up to 40 mole %, or up to 25 mole %, or up to 20 mole %, or up to 15 mole %, or up to 10 mole %, of the grafted-on monomers of component (c) are hydrolyzed. For instance, the hydrolysis of graft polymers prepared using vinyl acetate or vinyl propionate as component (c) gives graft polymers containing vinyl alcohol units. The hydrolysis may be carried out, for example, by adding a base, such as sodium hydroxide solution or potassium hydroxide solution, or alternatively by adding acids and if necessary heating the mixture. Without wishing to be bound by theory, it is believed that increasing the level of hydrolysis of component (c) increases the relative hydrophilicity of the graft polymer, which in turn is believed to result in better suspension of the captured dyes.

Treatment Adjunct

The compositions of the present disclosure may include a treatment adjunct. The treatment adjuncts may be suitable for delivering a treatment benefit to a target surface, such as a fabric or other textile. Treatment adjuncts, as used herein, may also include agents that facilitate chemical or physical stability in the treatment compositions, such as buffers, structurants/thickeners, and/or carriers.

The treatment adjunct(s) may be present in the composition at levels suitable for the intended use of the composition. Typical usage levels range from as low as 0.001% by weight of composition for adjuncts such as optical brighteners to 50% by weight of composition for builders.

The treatment adjunct may include a surfactant system, fatty acids and/or salts thereof, enzymes, encapsulated benefit agents, soil release polymers, hueing agents, builders, chelating agents, dye transfer inhibiting agents, dispersants, enzyme stabilizers, catalytic materials, bleaching agents, bleach catalysts, bleach activators, polymeric dispersing agents, soil removal/anti-redeposition agents, polymeric dispersing agents, polymeric grease cleaning agents, amphiphilic copolymers (including those that are free of vinyl pyrrolidone), brighteners, suds suppressors, dyes, hueing agents, perfume, structure elasticizing agents, fabric softeners, carriers, fillers, hydrotropes, solvents, anti-microbial agents and/or preservatives, neutralizers and/or pH adjusting agents, processing aids, fillers, rheology modifiers or structurants, opacifiers, pearlescent agents, pigments, anti-corrosion and/or anti-tarnishing agents, and mixtures thereof.

The treatment adjunct may include a surfactant system, an optical brightener, an enzyme such as a protease, a hueing agent, an alkoxylated polyalkyleneimine polymer, an amphiphilic polymer, a traditional DTI polymer, an external structuring system, or combinations thereof. The treatment adjunct may include an encapsulated benefit agent, which may be encapsulated perfume, preferably where the encapsulated perfume comprises a shell surrounding a core, preferably where the shell is comprises amine compounds and/or acrylate polymers.

Several treatment adjuncts are discussed in more detail below.

Surfactant System

Compositions according to the present disclosure may include a surfactant system. The surfactant system may consist of one type of surfactant. The surfactant system may include more than one surfactant.

The compositions of the present disclosure may include from about from about 1% to about 70%, or from about 2% to about 60%, or from about 5% to about 50%, by weight of the composition, of a surfactant system. Liquid compositions may include from about 5% to about 40%, by weight of the composition, of a surfactant system. Compact formulations, including compact liquids, gels, and/or compositions suitable for a unit dose form, may include from about 25% to about 70%, or from about 30% to about 50%, by weight of the composition, of a surfactant system.

The surfactant system may include anionic surfactant, nonionic surfactant, zwitterionic surfactant, cationic surfactant, amphoteric surfactant, or combinations thereof. The surfactant system may include linear alkyl benzene sulfonate, alkyl ethoxylated sulfate, alkyl sulfate, nonionic surfactant such as ethoxylated alcohol, amine oxide, or mixtures thereof. The surfactants may be, at least in part, derived from natural sources, such as natural feedstock alcohols.

Suitable anionic surfactants may include any conventional anionic surfactant. This may include a sulfate detersive surfactant, for e.g., alkoxylated and/or non-alkoxylated alkyl sulfate materials, and/or sulfonic detersive surfactants, e.g., alkyl benzene sulfonates. The anionic surfactants may be linear, branched, or combinations thereof. Preferred surfactants include linear alkyl benzene sulfonate (LAS), alkyl ethoxylated sulfate (AES), alkyl sulfates (AS), or mixtures thereof. Other suitable anionic surfactants include branched modified alkyl benzene sulfonates (MLAS), methyl ester sulfonates (MES), and/or alkyl ethoxylated carboxylates (AEC). The anionic surfactants may be present in acid form, salt form, or mixtures thereof. The anionic surfactants may be neutralized, in part or in whole, for example, by an alkali metal (e.g., sodium) or an amine (e.g., monoethanolamine).

The surfactant system may include nonionic surfactant. Suitable nonionic surfactants include alkoxylated fatty alcohols, such as ethoxylated fatty alcohols. Other suitable nonionic surfactants include alkoxylated alkyl phenols, alkyl phenol condensates, mid-chain branched alcohols, mid-chain branched alkyl alkoxylates, alkylpolysaccharides (e.g., alkylpolyglycosides), polyhydroxy fatty acid amides, ether capped poly(oxyalkylated) alcohol surfactants, and mixtures thereof. The alkoxylate units may be ethyleneoxy units, propyleneoxy units, or mixtures thereof. The nonionic surfactants may be linear, branched (e.g., mid-chain branched), or a combination thereof. Specific nonionic surfactants may include alcohols having an average of from about 12 to about 16 carbons, and an average of from about 3 to about 9 ethoxy groups, such as C12-C14 EO7 nonionic surfactant.

Suitable zwitterionic surfactants may include any conventional zwitterionic surfactant, such as betaines, including alkyl dimethyl betaine and cocodimethyl amidopropyl betaine, $C_8$ to $C_{18}$ (for example from $C_{12}$ to $C_{18}$) amine oxides (e.g., $C_{12-14}$ dimethyl amine oxide), and/or sulfo and hydroxy betaines, such as N-alkyl-N,N-dimethylammino-1-propane sulfonate where the alkyl group can be $C_8$ to $C_{18}$, or from $C_{10}$ to $C_{14}$. The zwitterionic surfactant may include amine oxide.

Other Treatment Adjuncts

The compositions of the present disclosure may include an optical brightener. Brighteners, also sometimes referred to as fluorescent whitening agents, may emit at least some visible light. It has been found that commercial brighteners, which tend to be relatively hydrophobic, may be relatively incompatible with certain DTI polymers in certain composition forms. Without wishing to be bound by theory, it is believed that when the vinyl pyrrolidone content of a DTI polymer is relatively high, the DTI polymers can complex with the brighteners, which may lead to precipitation. It is believed that at least some of the polymers according to the present disclosure do not form such precipitates in the presence of brightener because the VP content is relatively low (e.g., below 50 wt % of the graft polymer).

Commercial optical brighteners, which may be used herein, can be classified into subgroups, which include, but are not necessarily limited to, derivatives of stilbene, pyrazoline, coumarin, carboxylic acid, methinecyanines, dibenzothiphene-5,5-dioxide, azoles, 5- and 6-membered-ring heterocycles, and other miscellaneous agents. The brighteners may be added in particulate form or as a premix with a suitable solvent, for example nonionic surfactant, monoethanolamine, and/or propane diol.

Suitable fluorescent brighteners may include: disodium 4,4'-bis{[4-anilino-6-morpholino-s-triazin-2-yl]-amino}-2,2'-stilbenedisulfonate (Brightener 15, commercially available under the tradename Tinopal AMS-GX by Ciba Geigy Corporation); disodium 4,4'-bis{[4-anilino-6-(N-2-bis-hydroxyethyl)-s-triazine-2-yl]-amino}-2,2'-stilbenedisulonate (commercially available under the tradename Tinopal UNPA-GX by Ciba-Geigy Corporation); disodium 4,4'-bis{[4-anilino-6-(N-2-hydroxyethyl-N-methylamino)-s-triazine-2-yl]-amino}-2,2'-stilbenedisulfonate (commercially available under the tradename Tinopal SBM-GX by Ciba-Geigy Corporation); and/or disodium 4,4'-bis((4-amino-6-anilino-1,3,5-triazin-2-yl)amino)stilbene-2,2'-disulphonate (Brightener 49). The brightener may be Brightener 49, Brightener 15, or mixtures thereof.

The treatment compositions of the present disclosure may include one or more enzymes that provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, ß-glucanases, arabinosidases, hyaluronidase, chondroitinase, laccase, and amylases, or mixtures thereof. Particularly preferred may be a mixture of protease, amylase, lipase, cellulase, and/or pectate lyase.

In particular, it has been found that the present graft polymer in combination with particular enzymes, namely protease, can provide surprising benefits on certain fabric materials, which may have been treated by the fabric manufacturer. Suitable proteases may include metalloproteases and serine proteases, such as including neutral or alkaline microbial serine proteases, such as subtilisins (EC 3.4.21.62). The protease may be a trypsin-type or chymotrypsin-type protease. The protease may be of microbial origin, such as of bacterial origin or of fungal origin. The protease may be a chemically or genetically modified mutant or variant of a wild type.

The compositions of the present disclosure may include a hueing agent. It has surprisingly been found that graft polymers according to the present disclosure may inhibit transfer of fugitive dyes, while having little effect on the deposition and/or performance of hueing agents on target fabrics.

Hueing agents (sometimes referred to as hueing dyes, fabric shading dyes, or bluing or whitening agents) typically provides a blue or violet shade to fabric. Such agent(s) are well known in the art and may be used either alone or in combination to create a specific shade of hueing and/or to shade different fabric types. The hueing agent may be selected from any suitable chemical class of dye as known in the art, including but not limited to acridine, anthraquinone (including polycyclic quinones), azine, azo (e.g., monoazo, disazo, trisazo, tetrakisazo, polyazo), benzodifurane, benzodifuranone, carotenoid, coumarin, cyanine, diazahemicyanine, diphenylmethane, formazan, hemicyanine, indigoids, methane, naphthalimides, naphthoquinone, nitro, nitroso, oxazine, phthalocyanine, pyrazoles, stilbene, styryl, triarylmethane, triphenylmethane, xanthenes and mixtures thereof. The hueing agent may be selected from an azo agent, a triarylmethane agent, a triphenylmethane agent, or mixtures thereof.

Suitable hueing agents include fabric shading dyes such as small molecule dyes, polymeric dyes, and dye-clay conjugates. Preferred fabric shading dyes are selected from small molecule dyes and polymeric dyes. Suitable small molecule dyes may be selected from the group consisting of dyes falling into the Colour Index (C.I., Society of Dyers and Colourists, Bradford, UK) classifications of Acid, Direct, Basic, Reactive, Solvent or Disperse dyes.

Suitable polymeric dyes include dyes selected from the group consisting of polymers containing covalently bound (sometimes referred to as conjugated) chromogens, (also known as dye-polymer conjugates), for example polymers with chromogen monomers co-polymerized into the backbone of the polymer and mixtures thereof. Preferred polymeric dyes comprise the optionally substituted alkoxylated dyes, such as alkoxylated triphenyl-methane polymeric colourants, alkoxylated carbocyclic and alkoxylated heterocyclic azo colourants including alkoxylated thiophene polymeric colourants, and mixtures thereof, such as the fabric-substantive colorants sold under the name of Liquitint® (Milliken, Spartanburg, S.C., USA).

Suitable dye clay conjugates include dye clay conjugates selected from the group comprising at least one cationic/basic dye and a smectite clay; a preferred clay may be selected from the group consisting of Montmorillonite clay, Hectorite clay, Saponite clay and mixtures thereof.

Pigments are well known in the art and may also be used as hueing agents in the fabric care compositions disclosed herein. Suitable pigments may include C.I Pigment Blues 15 to 20, especially 15 and/or 16, C.I. Pigment Blue 29, C.I. Pigment Violet 15, Monastral Blue, and mixtures thereof.

The amount of adjunct hueing agent present in a laundry care composition of the invention may be from 0.0001 to 0.05 wt % based on the total cleaning composition, preferably from 0.0001 to 0.005 wt %. Based on the wash liquor, the concentration of hueing agent may be from 1 ppb to 5 ppm, preferably from 10 ppb to 500 ppb.

The compositions of the present disclosure may comprise an alkoxylated polyalkyleneimine polymer, such as an alkoxylated polyethyleneimine (PEI) polymer as described above. Such PEI polymers may facilitate viscosity modification of the compositions. The alkoxylated polyalkylenimine may be present in the composition at a level of from about 0.1% to about 5%, or from about 0.5% to about 4.5%, preferably from about 0.75% to about 1.5%, by weight of the composition. The alkoxylated polyalkyleneimine polymer, preferably alkoxylated PEI, may comprise ethoxylate (EO) groups, propoxylate (PO) groups, or combinations thereof. The alkoxylated polyalkyleneimine polymer, preferably alkoxylated PEI, may comprise ethoxylate (EO) groups. The alkoxylated polyalkyleneimine polymer, preferably alkoxylated PEI, may be free of propoxylate (PO) groups. The alkoxylated polyalkyleneimine polymer, preferably alkoxylated PEI, may comprise on average per alkoxylated nitrogen, about 1-50 ethoxylate (EO) groups and about 0-30 propoxylate (PO) groups. The alkoxylated polyalkyleneimine may be linear, branched, or combinations thereof, preferably branched. Suitable alkoxylated polyalkyleneimines, such as PEI600 EO20 and/or PEI600 EO24 PO16, are available from BASF (Ludwigshafen, Germany).

Liquid compositions according to the present disclosure may include an external structurant. It has been found that liquid fabric care compositions that include graft polymers according to the present disclosure may not be physically stable; for example, such compositions may separate. It has further been found that external structurants can provide physical stability to liquid compositions according to the present disclosure. External structurants may include non-polymeric crystalline, hydroxy-functional structurants and/or polymeric structurants.

Non-polymeric crystalline, hydroxyl functional structurants may comprise a crystallizable glyceride, which may be pre-emulsified to aid dispersion into the final detergent composition. Suitable crystallizable glycerides include hydrogenated castor oil or "HCO" or derivatives thereof, provided that it is capable of crystallizing in the liquid detergent composition.

Polymeric structurants may include naturally derived structurants and/or synthetic structurants. Naturally derived polymeric structurants include: hydroxyethyl cellulose, hydrophobically modified hydroxyethyl cellulose, carboxymethyl cellulose, polysaccharide derivatives and mixtures thereof. Suitable polysaccharide derivatives include: pectine, alginate, arabinogalactan (gum Arabic), carrageenan, gellan gum, xanthan gum, guar gum and mixtures thereof. The structurant may comprise cellulosic fibers, for example in the form of microfibrillated cellulose. Cellulose may be derived from bacterial, wood, or other plants such as fruit or sugar beet.

Synthetic polymeric structurants include: polycarboxylates, polyacrylates, hydrophobically modified ethoxylated urethanes, hydrophobically modified non-ionic polyols and mixtures thereof. The polycarboxylate polymer may be a polyacrylate, polymethacrylate or mixtures thereof. The polyacrylate may be a copolymer of unsaturated mono- or di-carbonic acid and $C_1$-$C_{30}$ alkyl ester of the (meth)acrylic acid. Such copolymers are available from Lubrizol Corp. under the tradename Carbopol® Aqua 30.

The compositions of the present disclosure may include an amphiphilic graft copolymer, which may be based on water-soluble polyalkylene oxides (A) as a graft base and side chains formed by polymerization of a vinyl ester component (B), where the amphiphilic graft copolymer is preferably free of vinyl pyrrolidone (VP) components. It is believed that such copolymers, which are free of VP, may be complimentary to the graft copolymers of the present disclosure, in that they may help to provide additional dye control and/or other cleaning benefits.

Water-soluble polyalkylene oxides suitable for forming the graft base (A) include polymers based on C2-C4-alkylene oxides. The graft bases may comprise at least 50% by weight, preferably at least 60% by weight, more preferably at least 75% by weight of ethylene oxide in copolymerized form. The graft base (A) may be polyethylene glycol or a derivative thereof. The vinyl ester component (B) may comprise, or even consist of, vinyl acetate, vinyl propionate, or mixtures thereof. The vinyl ester component (B) may be vinyl acetate. The vinyl ester component (B), such as vinyl acetate, may be at least partially hydrolyzed.

The amphiphilic graft copolymers comprise (A) from 20 to 70% by weight of a water-soluble polyalkylene oxide as a graft base and (B) side chains formed by free-radical polymerization of from 30 to 80% by weight of a vinyl ester component composed of (B1) from 70 to 100% by weight of vinyl acetate and/or vinyl propionate and (B2) from 0 to 30% by weight of a further ethylenically unsaturated monomer in the presence of (A). The amphiphilic graft copolymers may comprise from 25 to 60% by weight of the graft base (A) and from 40 to 75% by weight of the polyvinyl ester component (B), preferably wherein the relative weight % of (A) and (B) add up to 100% by weight of the copolymer.

The amphiphilic graft polymers may have a low degree of branching (degree of grafting). They may have, on average, based on the reaction mixture obtained, not more than 1 graft site, preferably not more than 0.6 graft site, more preferably not more than 0.5 graft site and most preferably not more than 0.4 graft site per 50 alkylene oxide units. They may comprise, on average, based on the reaction mixture obtained, preferably at least 0.05, in particular at least 0.1 graft site per 50 alkylene oxide units. The degree of branching can be determined, for example, by means of $^{13}C$ NMR spectroscopy from the integrals of the signals of the graft sites and the —CH2-groups of the polyalkylene oxide.

The mean molecular weight Mw of the preferred amphiphilic graft polymers may from 3000 to 100,000, preferably from 6000 to 45,000, and more preferably from 8000 to 30,000 Da. The weight ratio of the graft copolymer of the present disclosure to amphiphilic polymer may be from about 1:10 to about 10:1. A suitable amphiphilic graft copolymer is Sokalan HP22, supplied from BASF.

The compositions of the present disclosure may include traditional dye transfer inhibitor (DTI) polymers, such as polyvinyl pyrrolidone (PVP), poly(vinylpyrine-N-oxide) (PVNO), polyvinylpyrrolidone-co-polyvinylimidazole (PVP/PVI), poly(vinylpyrrolidone)co-poly(vinylpyridine-N-oxide) (PVP/PVNO), or mixtures thereof. It is believed that formulating with both the copolymer of the present disclosure, which is believed to be effective at controlling hydrolyzed reactive dyes, and traditional DTI polymers, which are believed to be effective at controlling direct dyes, can provide a fabric care composition that provides more effective dye control across the wide spectrum of fabric types and dyes present in modern loads of laundry. Commercially available DTI polymers include Kollidon 90, Reilline 4035, and Sokalan HP 56. The weight ratio of the graft copolymer of the present disclosure to traditional DTI polymer may be from about 1:10 to about 10:1.

The compositions of the present disclosure may include solvent, preferably organic solvent, such as a non-amino-functional organic solvent. Suitable organic solvents may include glycerol, ethylene glycol, 1,3 propanediol, 1,2 propanediol, tetramethylene glycol, pentamethylene glycol, hexamethylene glycol, 2,3-butane diol, 1,3 butanediol, diethylene glycol, triethylene glycol, polyethylene glycol, glycerol formal dipropylene glycol, polypropylene glycol, dipropylene glycol n-butyl ether, and mixtures thereof.

It may be desirable to limit or even eliminate certain adjuncts, particularly if a detergent sourced primarily from natural or sustainable sources is desired. The detergent compositions of the present disclosure may be free of silicone, dye, brightener, or combinations thereof. The detergent compositions of the present disclosure may comprise less than 5%, or less than 3%, or less than 1%, by weight of the composition, of amine-containing compounds, with the proviso that amine oxide surfactant (if present) is not included in the total amount of amine-containing compounds.

Method of Making a Composition

The present disclosure relates to methods of making fabric care compositions comprising the graft copolymers described herein. The method may include combining the components of the compositions described herein in the proportions described. For example, a graft polymer according to the present disclosure may be provided and combined with at least one treatment adjunct to form a fabric care composition.

Liquid compositions according to the present disclosure may be made according to conventional methods, for example in a batch process or in a continuous loop process.

Solid compositions according to the present disclosure may be made according to conventional methods, for example by spray-drying process or in an agglomeration process.

The detergent compositions described herein may be encapsulated in a pouch, preferably a pouch made of water-soluble film, to form a unit dose article that may be used to treat fabrics. It may be preferred that such compositions have relatively low amounts of water, for example less than about 20%, or less than about 15%, or less than about 12%, or less than about 10%, or less than about 8%, by weight of the detergent composition, of water.

Method of Using Compositions

The present disclosure relates to methods of using the compositions described herein. The detergent compositions may be a fabric care composition and may be used to treat a surface, such as a fabric or other textile.

Methods of treating a surface may include the steps of: providing a surface, preferably a fabric, and contacting the surface with a composition according to the present disclosure, as described above. The method may include agitating the fabric in the presence of water. The method may further comprise the step of carrying out a washing or cleaning operation. Water may be added before, during, or after the contacting step to form a treatment liquor.

The present disclosure also relates to a process for treating, for example by machine, a fabric, preferably soiled fabric, using a composition according to the present disclosure, comprising the steps of, placing a composition according to the present disclosure into contact with the fabric to be treated, and carrying out a treatment operation, such as a washing, cleaning, or fabric-enhancing operation. The contacting step may occur during the wash cycle or during the rinse cycle of an automatic washing machine.

Any suitable washing machine may be used, for example, a top-loading or front-loading automatic washing machine. Those skilled in the art will recognize suitable machines for the relevant treatment operation. The article of the present disclosure may be used in combination with other compositions, such as fabric additives, fabric softeners, rinse aids, and the like. Additionally, the detergent compositions of the present disclosure may be used in known hand washing methods.

The present disclosure may also be directed to a method of treating a fabric, the method comprising the steps of contacting a fabric with a detergent composition described herein, carrying out a washing step, and then contacting the fabric with a fabric softening composition. The entire method, or at least the washing step, may be carried out by hand, be machine-assisted, or occur in an automatic washing machine. The step of contacting the fabric with a fabric softening composition may occur in the presence of water, for example during a rinse cycle of an automatic washing machine.

The fabric to be treated may be a first fabric portion that is part of a laundry load, where the laundry load may comprise a second fabric portion. The second fabric portion may comprise a colorant, preferably a reactive dye or hydrolyzed product thereof. The first and second fabric portions may be part of the same article or garment. The first fabric portion may be part of a first article or garment, and the second fabric portion may be part of a second article or garment.

The processes of the present disclosure may include treating a multi-colored load of fabrics and/or garments. The processes of the present disclosure may include treating and/or contacting a first fabric portion and a second fabric portion with the same treatment liquor. The first fabric portion and the second fabric portion may be part of the same item or garment. The first fabric portion and the second fabric portion may be part of different items or garments. The first and second fabric portions may be of different colors. One of the first and second fabric portions may be light in color, while the other may be dark in color. One of the first and second fabric portions may be white, while the other may have a color. One of the first and second fabric portions may include a fabric substantive dye applied by the fabric or garment manufacturer, while the other may be undyed or substantially free of dye as provided by the fabric or garment manufacturer (e.g., substantially free of dye other than fugitive dyes from other portions or garments that have deposited onto the portion during previous wash or other treatment cycles). When on the same item or garment, the first portion may be adjacent to the second portion. The item or garment may comprise a multi-colored pattern, such as being striped, plaid, checked, or polka-dotted.

The first fabric portion may include a colorant. At least a portion of the colorant may be capable of escaping into the treatment liquor from the first fabric portion during a treatment process. The portion that escapes may be in terms of a certain percentage of the colorant that is initially present on the first fabric portion prior to the treatment process. The portion that escapes may be in terms of hydrolysis reaction products that are present after hydrolysis or other degradation of the colorant. The second fabric portion may be substantially free of the colorant, e.g., none of the colorant is intentionally applied to the second fabric portion by the manufacturer, and/or none is present other than any amount that have transferred during the present or previous treatment processes.

The colorant may be any colorant suitable for coloring a fabric or textile. The colorant may be a direct dye, a reactive dye, a disperse dye, an acid dye, a basic dye a vat or indigo dye, a sulfur dye, a derivative thereof, a hydrolyzed product thereof, or a combination thereof. It is believed that treatment composition that include the graft copolymer of the present disclosure are effective at inhibiting the transfer of colorants (such as dyes) from one portion of a fabric to another (dissimilarly colored) portion of the same fabric, or from one fabric to another fabric.

Use of Graft Co-Polymer

The present disclosure also relates to the use of a graft co-polymer according to the present disclosure as a dye transfer inhibitor in a fabric care composition, preferably where the dye is a reactive dye, more preferably a hydrolyzed reactive dye. Additionally or alternatively, the present disclosure further relates to a use of a graft co-polymer according to the present disclosure to inhibit discoloration and/or graying during treatment of a multi-colored fabric load.

Any graft co-polymer according to the present disclosure, as described above, may be suitable for the uses described herein. For example, the graft co-polymer may comprise and/or be obtainable by grafting (a) a polyalkylene oxide which has a number average molecular weight of from about 1000 to about 20,000 Daltons and is based on ethylene oxide, propylene oxide, or butylene oxide, preferably based on ethylene oxide, and (b) N-vinylpyrrolidone, and (c) vinyl ester derived from a saturated monocarboxylic acid containing from 1 to 6 carbon atoms and/or a methyl or ethyl ester of acrylic or methacrylic acid, preferably a vinyl ester that is vinyl acetate or a derivative thereof, wherein the weight ratio of (a):(b) is from about 1:0.1 to about 1:1, wherein the amount, by weight, of (a) is greater than the amount of (c), the order of the addition of monomers (b) and (c) in the graft polymerization being immaterial The use of the graft co-polymer may in a laundry treatment (e.g., a wash or rinse) operation, preferably wherein the graft co-polymer is comprised within a wash liquor wherein the wash liquor is in contact with fabrics to be washed. The wash liquor may be prepared by diluting a fabric care composition, preferably a liquid laundry detergent composition, in water, preferably by between 300- and 800-fold, more preferably between 400- and 700-fold, wherein the fabric care composition comprises the graft co-polymer. The fabric care composition may comprise between 0.1% and 10%, preferably between 0.5% and 7%, more preferably between 0.75% and 5% even more preferably between 1% and 4%, most preferably between 1.25% and 3% by weight of the fabric care composition of the graft co-polymer.

The fabric care composition may be in the form of a liquid composition, a granular composition, a single-compartment pouch, a multi-compartment pouch, a sheet, a pastille or bead, a fibrous article, a tablet, a bar, flake, or a mixture thereof. The fabric care composition may be a liquid composition, a granular composition, or a combination thereof. The fabric care composition may be comprised within a water-soluble unit dose article comprising a water-soluble film.

The fabrics to be treated during such use may be part of a laundry load. The load may include articles and/or garments. The load may comprise an article or garment that includes different colors (e.g., an article or garment comprises a first color and a second color), and/or the load may comprise articles or garments that are of different colors (e.g., a first article or garment comprises a first color, and a second article or garment comprises a second color that is different than the first color).

COMBINATIONS

Specifically contemplated combinations of the disclosure are herein described in the following lettered paragraphs. These combinations are intended to be illustrative in nature and are not intended to be limiting.

A. A composition comprising a graft copolymer and a treatment adjunct, the graft copolymer comprising (a) a polyalkylene oxide which has a number average molecular weight of from about 1000 to about 20,000 Daltons and is based on ethylene oxide, propylene oxide, or butylene oxide, (b) N-vinylpyrrolidone, and (c) vinyl ester derived from a saturated monocarboxylic acid containing from 1 to 6 carbon atoms and/or a methyl or ethyl ester of acrylic or methacrylic acid, wherein the weight ratio of (a):(b) is from about 1:0.1 to about 1:1, wherein the amount, by weight, of (a) is greater than the amount of (c), the order of the addition of monomers (b) and (c) in the graft polymerization being immaterial, and wherein the composition is a fabric care composition.

B. A composition comprising a graft copolymer and a treatment adjunct, the graft polymer comprising (a) an alkylene oxide which has a number average molecular weight of from about 1000 to 20,000 Daltons, the alkylene oxide being based on ethylene oxide, propylene oxide, or butylene oxide, (b) N-vinylpyrrolidone, and (c) vinyl acetate or a derivative thereof, the order of the addition of monomers (b) and (c) in the graft polymerization being immaterial, the treatment adjunct comprising a stilbene brightener, a hueing agent, a protease enzyme, a structurant, or mixtures thereof; wherein the composition is a fabric care composition.

C. A composition according to any of paragraphs A-B, wherein at least one of the following is true: the weight ratio of (a):(b) is from about 1:0.1 to about 1:2, or to about 1:1; the weight ratio of (b):(c) is from about 1:0.1 to about 1:5, or to about 1:4; the weight ratio of (a):(c) is from about 1:0.1 to about 1:5, or to about 1:3; or combinations thereof.

D. A composition according to any of paragraphs A-C, wherein the polyalkylene oxide is based on ethylene oxide.

E. A composition according to any of paragraphs A-D, wherein the polyalkylene oxide has a number average molecular weight of from about 2000, or from about 3000, or from about 4000, to about 15,000, or to about 12,000, or to about 10,000, or to about 8000, or to about 6000 Daltons.

F. A composition according to any of paragraphs A-E, wherein the vinyl ester is derived from a saturated monocarboxylic acid containing from 1 to 3 carbon atoms, preferably 1 carbon atom.

G. A composition according to any of paragraphs A-F, wherein the vinyl ester is vinyl acetate or a derivative thereof.

H. A composition according to any of paragraphs A-G, wherein the weight ratio of (a):(b) is from about 1:0.2 to about 1:0.7.

I. A composition according to any of paragraphs A-H, wherein the weight ratio of (a):(c) is from about 1:0.1 to about 1:0.8, preferably from about 1:0.2 to about 1:0.6.

J. A composition according to any of paragraphs A-I, wherein the weight ratio of (b):(c) is from about 1:0.1 to about 1:4.

K. A composition according to any of paragraphs A-J, wherein from about 1 mol % to about 60 mol % of component (c) is hydrolyzed.

L. A composition according to any of paragraphs A-K, wherein the number of grafting sites of the graft polymer is equal to or less than about 1 per 50 ethylene oxide groups.

M. A composition according to any of paragraphs A-L, wherein the composition comprises from about 0.1% to about 15%, or to about 10%, or to about 5%, or to about 3%, by weight of the composition, of the graft copolymer.

N. A composition according to any of paragraphs A-M, wherein the treatment adjunct is selected from the group consisting of a surfactant system, fatty acids and/or salts thereof, enzymes, encapsulated benefit agents, soil release polymers, hueing agents, builders, chelating agents, dye transfer inhibiting agents, dispersants, enzyme stabilizers, catalytic materials, bleaching agents, bleach catalysts, bleach activators, polymeric dispersing agents, soil removal/anti-redeposition agents, polymeric grease cleaning agents, amphiphilic copolymers, brighteners, suds suppressors, dyes, hueing agents, perfume, structure elasticizing agents, fabric softeners, carriers, fillers, hydrotropes, solvents, antimicrobial agents and/or preservatives, neutralizers and/or pH adjusting agents, processing aids, rheology modifiers and/or structurants, opacifiers, pearlescent agents, pigments, anti-corrosion and/or anti-tarnishing agents, and mixtures thereof.

O. A composition according any of paragraphs A-N, wherein the treatment adjunct comprises a hueing agent, preferably a hueing agent selected from an azo agent, a triarylmethane agent, a triphenylmethane agent, or mixtures thereof.

P. A composition according to any of paragraphs A-P, wherein the treatment adjunct comprises an enzyme, preferably a protease enzyme.

Q. A composition according to any of paragraphs A-P, the composition further comprising a structurant.

R. A composition according to any of paragraphs A-Q, wherein the composition comprises from about 1% to about 70%, by weight of the composition, of a surfactant system, preferably a surfactant system comprising anionic surfactant, nonionic surfactant, amphoteric surfactant, zwitterionic surfactant, or combinations thereof.

S. A composition according to any of paragraphs A-R, wherein the composition further comprises a polymer selected from the group consisting of: an amphiphilic copolymer that is free of vinyl pyrrolidone, the amphiphilic copolymer preferably comprising vinyl acetate grafted to a polyalkylene oxide base; polyvinyl pyrrolidone (PVP); poly(vinylpyrine-N-oxide) (PVNO); polyvinylpyrrolidone-co-polyvinylimidazole (PVP/PVI); poly(vinylpyrrolidone)co-poly(vinylpyridine-N-oxide) (PVP/PVNO); or mixtures thereof.

T. A composition according to any of paragraphs A-S, wherein the composition is in the form of a liquid composition, a granular composition, a single-compartment pouch, a multi-compartment pouch, a sheet, a pastille or bead, a fibrous article, a tablet, a bar, flake, or a mixture thereof.

U. A process of treating a fabric, the process comprising the steps of: providing a fabric, and contacting the fabric with a composition according to any of paragraphs A-T, optionally in the presence of water.

V. A process according to paragraph U, wherein the fabric is a first fabric portion that is part of a laundry load, the laundry load comprising a second fabric portion that comprises a colorant, preferably a reactive dye or hydrolyzed product thereof.

W. A process according to paragraph V, wherein the first fabric portion is part of a first article or garment, and wherein the second fabric portion is part of a second article or garment.

X. A use of a graft co-polymer as a dye transfer inhibitor in a fabric care composition, preferably where the dye is a reactive dye, more preferably a hydrolyzed reactive dye, wherein the graft copolymer comprises (a) a polyalkylene oxide which has a number average molecular weight of from about 1000 to about 20,000 Daltons and is based on ethylene oxide, propylene oxide, or butylene oxide, preferably based on ethylene oxide, and (b) N-vinylpyrrolidone, and (c) vinyl ester derived from a saturated monocarboxylic acid containing from 1 to 6 carbon atoms and/or a methyl or ethyl ester of acrylic or methacrylic acid, preferably a vinyl ester that is vinyl acetate or a derivative thereof, wherein the weight ratio of (a):(b) is from about 1:0.1 to about 1:1, wherein the amount, by weight, of (a) is greater than the amount of (c), the order of the addition of monomers (b) and (c) in the graft polymerization being immaterial.

TEST METHODS

K-Value

K-value measures the relative viscosity of dilute polymer solutions and is a relative measure of the average molecular weight. As the average molecular weight of the polymer increases for a particular polymer, the K-value tends to also increase. The K-value is determined in a 3% by weight NaCl solution at 23° C. and a polymer concentration of 1% polymer according to the method of H. Fikentscher in *Cellulosechemie*, 1932, 13, 58.

Fabric Treatment

Before testing for dye transfer or whiteness, the test fabrics are typically washed one time with detergent (e.g., for dye transfer tests), "de-sized" and/or "stripped" to remove any manufacturer's finish that may be present, and/or pre-conditioned with soil (e.g., for whiteness tests) according to A (below). Fabrics are dried, and then treated with a detergent composition in a mini-washing machine that is designed to mimic full-scale washing machine conditions according to B and C (below). The mini-washer uses a stainless steel cylinder spray-coated with porcelain spraying kit typically used on bathtubs (25 cm diameter by 22 cm height) that is fitted with a staggered level, 5-vane paddle with controllable settings for fill, wash/rinse times, and spin-speeds.

A1. Fabric Pre-Wash.

New fabrics are pre-washed by washing one cycle in a WE front loading washing machine such as Miele W1724 at 30° C. (86° F.), using 15 gpg water on the Cotton short cycle setting. For 100% cotton and nylon/spandex, 69 g of detergent 2A (but free of cleaning polymers, zwitterionic ethoxylated quaternized sulfated hexamethylene diamine, brightener and enzymes) is added to the dispenser drawer. Acrylic 871 is pre-washed in a NA Top loading machine using the same procedure as A2 below with 48 g of detergent with a 64 L fill volume in a 3 kg load of fabric. Fabrics are tumble-dried for 55 minutes on cotton/high setting in a Kenmore series dryer.

A2. Stripping of Fabrics.

New fabrics are stripped by washing five times in a high capacity front-loading washing machine such as a Milnor model number 30022X8J at 60° C. (140° F.) using 0 gpg water. The machine is programmed to fill and drain 15 times for a total of 1420 L (375 gallons) of water. The first and second wash cycles use 175 g of detergent (AATCC 2003 Standard Reference Liquid Detergent without optical brightener, available from Test Fabrics Inc., West Pittston, Pa.), which is added to a 20-23 kg load of fabric. Each wash cycle is followed by two rinses, and the second wash cycle is followed by three additional wash cycles without detergent or until no suds are observed. The fabrics are then dried in a tumble dryer until completely dry and used in the fabric treatment/test method.

A3. Pre-Conditioning with Soil.

Stripped fabrics are washed with soil to create artificially dingy fabrics to test for whiteness using a standard North American top-loading machine such as a Kenmore 600 Series using 7 gpg water at 32° C. (90° F.) for the wash and 15° C. (60° F.) for the rinse. Detergent (AATCC 2003 Standard Reference Liquid Detergent without optical brightener, from Test Fabrics Inc., W. Pittston, Pa.) and SBL2004 Technical Soil Sheets (available from WfK Testgewebe GmbH, Brüggen, Germany, containing 8 g of soil per sheet) are added to the water and agitated for sixty seconds before the fabrics are added. The machine is set to a 12-minute, normal wash, and scent-free Liquid Fabric Softener (such as Downy Free and Gentle) is added to the rinse. Washing cycles are repeated 3-5 times until a loss of 20 WI (CIE) units from initial fabric is achieved. The poly/cotton fabric is pre-conditioned using eight SBL2004 soil sheets in a 1.5 kg load containing equal number of 10 cm×10 cm pieces of polyester and poly/cotton material with a 49 L fill volume.

The 100% cotton fabric is pre-conditioned using thirteen SBL2004 soil sheets in a 3 kg load containing equal number of 10 cm×10 cm pieces of cotton and cotton/spandex fabrics with a 64 L fill volume.

B. Dye Transfer Fabric Treatment Method in a Mini-Washing Machine.

Pre-washed fabrics are treated with a detergent composition in the presence of dye bleeder fabrics using a Mini-washing Machine. For the Mid-Scale Dye Control method, the mini-washer is filled to a 5.7 L fill volume and is programmed for a 60-minute wash cycle, and a 20-minute rinse cycle with an agitation speed of 75 strokes per minute using 15 gpg/50° C. (122° F.) water for the wash and 15 gpg/38° C. (100° F.) water for the rinse. The detergent composition (30 g) is added to the washing pot after the water is filled, agitated for 30 s, then dye bleeder fabrics (as described below) are added to the machine and agitated for 60 s, and then pre-washed dye acceptor fabrics and ballast are added. The acceptor fabrics (120 g) are two white t-shirts (100% cotton, Gildan, Toddler size 2T), with test fabric swatches (9.5 cm×9.5 cm) sewn onto the shirt. Test fabrics may include 80/20 nylon/spandex #19505 and 98/2 cotton/spandex #19506 (available from WfK Testgewebe GmbH, Brüggen, Germany), Multi-Fiber Fabric #49, and/or acrylic #871 (available from Test Fabrics, W. Pittston, Pa.). Ballast fabrics (three white 100% cotton, white Gildan t-shirts, Toddler size 2T and two 50/50 cotton/polyester, white Gildan t-shirts Youth, size XS) are added for a total fabric weight of 400±15 g. Once the detergent, and all test fabrics are added to the mini-washer, the timed cycle begins. After the washing cycle is complete, the dye bleeder fabrics are removed, and the acceptor fabrics and ballast are dried in an automatic tumble dryer on low for 45 min (Kenmore dryer series), or until dry. Test fabrics are de-linted using a lint roller to remove any fuzz that could interfere with the spectrophotometer measurement.

B1. Description of the Bleeder Fabrics.

Dyed Fabrics may be obtained from Test Fabrics (West Pittston, Pa.) Pieces (7.6 cm×11.4 cm size pieces) may be added to the mini-washer according to the table below.

(available from WfK Testgewebe GmbH, Brüggen, Germany) is added to the washing pot after the water is filled, agitated for 60 s, then pre-conditioned test fabrics and ballast are added to the machine. The test fabrics are two each of pre-conditioned, 100% cotton knit (#19502) and 65/35 poly/cotton (#19503) 10 cm×10 cm pieces, available from WfK Testgewebe GmbH, Brüggen, Germany). The remainder of the load contains two white Gildan 2T 100% Cotton T-Shirt (Gildan® Toddler Heavy Cotton™ 100% Cotton T-Shirt, size 2T (#5100P available from Albrechtco) with 5 cm×5 cm pieces of 100% cotton (#19502), 98/2 cotton/spandex (#19506), 80/20 nylon/spandex (19505), polyamide (#19504), polyester (#19508), and MFF #49 sewn onto the t-shirt and stripped, and 2 pieces of 7.6 cm×7.6 cm cut from 100% cotton, dingy T-shirts purchased from St. Vincent DePaul Donations (Cincinnati, Ohio). Ballast fabrics that are stripped (10 cm×10 cm pieces of 100% cotton, and 50/50 polyester/cotton, available from Calderon Textiles, Indianapolis, Ind.) are added to reach a total fabric weight of 350±10 g. Once the detergent, and all test fabrics are added to the mini-washer, the timed cycle begins. After the washing cycle is complete, the fabrics and ballast are dried in an automatic tumble dryer (Kenmore dryer series) on high for 55 minutes, or until dry. Fabrics are equilibrated at 50% RH for 24 h before measuring.

Dye Transfer Measurement Method on Treated Fabrics

As used herein and as will be familiar one of ordinary skill, the "L*C*h color space" and "L*a*b* color space" are three dimensional colorimetric models developed by Hunter Associates Laboratory and recommended by the Commission Internationale d'Eclairage ("CIE") to measure the color or change in color of a dyed article. The CIE L*a*b* color space ("CIELAB") has a scale with three-fold axes with the L axis representing the lightness of the color space (L*=0 for black, L*=100 for white), the a* axis representing color space from red to green (a*>0 for red, a*<0 for green) and the b* axis representing color space from yellow to blue (b*>0 for yellow, b*<0 for blue). The L*C*h color space is an approximately uniform scale with a polar color space. The CIE L*C*h color space ("CIELCh") scale values are

| Used in Example: | Total Bleeder Fabrics (g) | Description | No. of pieces |
|---|---|---|---|
| 3A-B; 5A (new), | 14 | Reactive Red 158 | 20 |
| 3C-D, 6, 8 | 22 | Reactive Black 5 (EMPA 496) | 20 |
| 3E-F; 8 | 3 | Indigo/Sulfur Black 1 (EMPA 278) | 10 |
| 4; 5 | 92 | Reactive Blue 225 (STC EMPA 135) | 15 |
|  |  | Reactive Brown 7 (STC EMPA 136) | 25 |
|  |  | Reactive Red 158 (STC EMPA 137) | 25 |
|  |  | Reactive Black 5 (EMPA 496) | 20 |
|  |  | Disperse Blue 79 (EMPA 478) | 10 |
| 7 | 50 | Reactive Brown 7 (STC EMPA 136) | 20 |
|  |  | Reactive Red 158 (STC EMPA 137) | 20 |
|  |  | Reactive Black 5 (EMPA 496) | 15 |

C. Whiteness Fabric Treatment Method in a Mini-Washing Machine:

Pre-conditioned fabrics are treated with a detergent composition in the presence of artificial soil using a Mini-washing Machine. For the whiteness method, the mini-washer is filled to a 7.6 L fill volume and is programmed for a 20-min wash cycle, and a 2-min rinse cycle with an agitation speed of 80 strokes per min using 15 gpg/50° C. (122° F.) water for the wash and 15 gpg/38° C. (100° F.) water for the rinse. The agitation speed is increased to 100 strokes per min for 2 min for the final spin. The detergent composition (34 g) and one SBL2004 artificial soil sheet determined instrumentally and may also be calculated from the CIELAB scale values. Term definitions and equation derivations are available from Hunter Associates Laboratory, Inc. and from www.hunterlab.com, and are incorporated in their entirety by reference herein.

The amount of dye transfer onto the acceptor fabrics can be described, for example, in terms of the change in L*C*h before and after treatment of the fabric as measured via spectrophotometry (for example, via a Spectrophotomer CM-3610d, manufactured by Konica Minolta, Tokyo, Japan) and is reported as dE2000 value. As used herein, the dE2000 value includes the vector associated with the distance in the L*C*h space between the initial L*C*h value and the final L*C*h value and corrected for perception according to the procedure detailed in G. Sharma, et al, in "The CIE dE2000 Colour Difference Formula: Implementation Notes, Supplementary test Data and Mathematical Observations," *Color Research and Application*, Vol 30 (1), 2005, p 21-30. Test fabrics are folded in half to double the thickness before measuring, except for test fabrics that are sewn onto the t-shirt, which are measured against the backing of the t-shirt. An average of two L*a*b* measures are taken per test fabric, and two fabrics are measured per example.

Relatively higher dE2000 values correspond to a greater color change, indicating that relatively more dye transferred to the fabric in question.

Whiteness Change Measurement Method

The ability of a cleaning composition to prevent white fabrics from showing loss of whiteness over multiple wash cycles, as well as its ability to clean up pre-conditioned dingy fabrics, is assessed by determining the Whiteness Change of treated fabrics by using the following method. This approach involves measuring the CIE Whiteness Index (WI) of pre-conditioned cotton knit and polyester/cotton fabrics before and after washing with the test product in the presence of technical soil-loaded fabrics.

Conduct Initial CIE Whiteness Index measurements on the stripped and dingy tracer swatches. After the final drying cycle, again measure the CIE Whiteness Index (WI) of each treated fabric tracer.

Measurements of CIE Whiteness Index are conducted on the tracer fabric swatches using a dual-beam spectrophotometer (such as the Konica Minolta Spectrophotometer, model 3601D available from equipped with Polaris White Star software available from Axiphos GmbH, Loerrach, Germany), configured with settings of: D65 illuminant; 10° observation angle; 0°/45° geometry; specular component excluded. Fold each fabric swatch in half to double the thickness before measuring, then conduct and average two CIE WI measurements per tracer swatch.

For each test product and/or for its control product, the average WI is calculated for the swatches after their initial pre-conditioning and again after washing with soils. The whiteness change, delta-WI, is then calculated for each product or control product as follows:

$$WI_{(average\ washed)} - WI_{(average\ initial)} = \Delta WI (Whiteness\ Change)$$

Relatively greater WI scores indicate increased whiteness and improved performance.

EXAMPLES

The examples provided below are intended to be illustrative in nature and are not intended to be limiting.

Synthesis Example 1

A polymerization vessel equipped with stirrer and reflux condenser is initially charged with 720 g of PEG (4000 g/mol) and 60 g ethyl acetate under nitrogen atmosphere. The mixture is homogenized at 70° C.

Then, 432 g of vinyl acetate (in 2 h), 288 g of vinylpyrrolidone in 576 g of ethyl acetate (in 5 h), and 30.2 g of tert.-butyl perpivalate in 196.6 g ethyl acetate (in 5.5 h) are metered in. Upon complete addition of the feeds, the solution is stirred at 70° C. for 1 h. Subsequently, 3.8 g tert.-butyl perpivalate in 25.0 g ethyl acetate (in 1.5 h) were metered in followed by 0.5 h of stirring.

The volatiles are removed by vacuum stripping. Then, 676.8 g deionized water are added and a steam distillation is conducted at 100° C. for 1 h.

The resulting graft polymer is characterized by a K-value of 20.8. The solid content of the final solution is 48.8%.

Example 1. Graft Copolymer Examples

The following table, Table 1, shows illustrative, non-limiting examples of graft copolymers according to the present disclosure; see examples 1A-1M. Additionally, comparative polymers are provided as examples 1N and 1O.

TABLE 1

| Graft Copolymer Examples | Monomer Ratio (by wt) | | | PEG Molecular Weight (Da) | K-Value | VAc Hydrolysis |
|---|---|---|---|---|---|---|
| | PEG | VP | VAc | | | |
| 1A | 1.00 | 0.28 | 0.13 | 4000 | 22.9 | <20% |
| 1B | 1.00 | 0.31 | 0.25 | 4000 | 21.6 | <20% |
| 1C | 1.00 | 0.35 | 0.40 | 4000 | 19.7 | <20% |
| 1D | 1.00 | 0.40 | 0.60 | 4000 | 20.1 | <20% |
| 1E | 1.00 | 0.40 | 0.60 | 2000 | 18.3 | <20% |
| 1F | 1.00 | 0.40 | 0.60 | 6000 | 23.5 | <20% |
| 1G | 1.00 | 0.40 | 0.60 | 8000 | 26.3 | <20% |
| 1H | 1.00 | 0.40 | 0.60 | 4000 | 20.6 | 20% |
| 1I | 1.00 | 0.40 | 0.60 | 4000 | 21 | 40% |
| 1J | 1.00 | 0.40 | 0.60 | 6000 | 24.4 | 20% |
| 1K | 1.00 | 0.40 | 0.60 | 6000 | 24.5 | 40% |
| 1L | 1.00 | 0.40 | 0.60 | 6000 | 24.4 | 60% |
| 1M | 1.00 | 0.50 | 1.00 | 4000 | 19.2 | <20% |
| 1N (Comparative) | 1.00 | none | 1.5 | 4000 | * | <20% |
| 1O (Comparative) | 1.00 | 0.67 | 1.67 | 4000 | 17.2 | <20% |
| 1P (Comparative) | 1.0 | 1.0 | 3.0 | 4000 | 16.0 | <20% |

PEG = poly(ethylene glycol);
VP = vinyl pyrrolidone;
VAc = vinyl acetate
* Not determined

Example 2. Liquid or Gel Detergents

Table 2 shows illustrative liquid or gel detergent fabric care compositions that may be prepared by mixing the ingredients listed in the proportions shown below.

TABLE 2

| Ingredient (wt %) | 2A | 2B | 2C | 2D | 2E | 2F | 2G | 2H | 2I |
|---|---|---|---|---|---|---|---|---|---|
| $C_{12}$-$C_{15}$ alkyl polyethoxylate sulfate[1] | 9.1 | 9.5 | 9.5 | 3.0 | 3.0 | 3.0 | 4.5 | 11.1 | 14.6 |
| $C_{11.8}$ linear alkylbenzene sulfonic acid[2] | 9.4 | 12.0 | 12.0 | 7.4 | 7.4 | 7.4 | 10.4 | 6.5 | 8.9 |
| $C_{12}$-$C_{14}$ alkyl 7-ethoxylate[1] | 0.9 | 1.9 | 1.9 | — | — | — | — | — | — |
| $C_{14}$-$C_{15}$ alkyl 7-ethoxylate[1] | 4.1 | 4.2 | 4.2 | 2.9 | 2.9 | 2.9 | 4.4 | — | — |
| $C_{12}$-$C_{14}$ alkyl 9-ethoxylate[1] | — | — | — | — | — | — | — | 0.1 | 3.7 |
| $C_{12}$-$C_{14}$ amine oxide | 1 | 0.3 | 0.8 | 0.4 | 0.4 | 0.4 | 0.4 | 0.7 | 0.9 |
| $C_{12}$-$C_{18}$ Fatty Acid[4] | 4.1 | 2.9 | 2.9 | 1.3 | 1.3 | 4.0 | 4.6 | 0.9 | 1.1 |
| 1,2 Propane diol[5] | 6.3 | 10.8 | 10.8 | 0.6 | 0.6 | 1.2 | 6.9 | 2.0 | 2.7 |
| Na Cumene Sulfonate | 0.5 | 0.2 | 0.2 | 1.3 | 1.3 | 1.3 | 2.0 | 0.1 | 0.2 |
| Citric acid | 5.5 | 2.3 | 2.3 | 2.8 | 2.8 | 2.8 | 3.0 | 2.0 | 2.6 |
| Fluorescent Whitening Agent[8] | 0.08 | 0.08 | 0.08 | — | — | — | — | 0.2 | 0.2 |
| Graft Co-polymer acc. to present disclosure, if any | | | | | 0.0-10.0% | | | | |
| Cleaning Polymer[10,11] | — | — | — | — | — | — | — | 2.8 | 3.6 |
| Cleaning Polymer[12] | 1.2 | none | 1.2 | 0.6 | none | 1.7 | 1.7 | — | — |
| Zwitterionic ethoxylated quaternized sulfated hexamethylene diamine[13] | 0.6 | 1.0 | 1.0 | 0.5 | 0.5 | 0.5 | 0.8 | — | — |
| Hydrogenated castor oil[14] | 0.2 | 0.2 | 0.2 | 0.3 | 0.3 | 0.3 | 0.3 | 0.1 | 0.1 |
| Water, enzymes[6,7], perfumes, encapsulated perfume[15], dyes, buffers, neutralizers, chelants, solvents, stabilizers, and other optional components | to 100% pH 7.0-8.5 | to 100% pH 7.0-8.5 | to 100% pH 7.0-8.5 | to 100% pH 7.0-8.5 | to 100% pH 7.0-8.5 | to 100% pH 7.0-8.5 | to 100% pH 7.0-8.5 | to 100% pH 7.0-8.5 | to 100% pH 7.0-8.5 |

[1] Available from Shell Chemicals, Houston, TX.
[2] Available from Huntsman Chemicals, Salt Lake City, UT.
[3] Available from Sasol Chemicals, Johannesburg, South Africa
[4] Available from The Procter & Gamble Company, Cincinnati, OH.
[5] Available from Sigma Aldrich chemicals, Milwaukee, WI
[6] Available from DuPont-Genencor, Palo Alto, CA.
[7] Available from Novozymes, Copenhagen, Denmark
[8] Available from Ciba Specialty Chemicals, High Point, NC
[9] Available from Milliken Chemical, Spartanburg, SC
[10] 600 g/mol molecular weight polyethylenimine core with 20 ethoxylate groups per —NH and available from BASF (Ludwigshafen, Germany)
[11] 600 g/mol molecular weight polyethylenimine core with 24 ethoxylate groups per —NH and 16 propoxylate groups per —NH. Available from BASF (Ludwigshafen, Germany)
[12] Described in U.S. Pat. No. 8,143,209 and available from BASF (Ludwigshafen, Germany)
[13] Described in WO 01/05874 and available from BASF (Ludwigshafen, Germany)
[14] Available under the tradename ThixinR from Elementis Specialties, Highstown, NJ
[15] Available from Appleton Paper of Appleton, WI

Example 3. Effect of Graft Copolymer on Dye Transfer

In this example, a graft copolymer according to Example 1D above is added to detergent compositions according to Examples 2A and 2B above and are compared in performance to corresponding compositions that do not include the graft copolymer.

The midscale dye transfer method is used to assess the amount of dye that has been transferred in one wash cycle from a "bleeder fabric" onto an "acceptor fabric" using individual bleeder dye fabrics added to a wash load containing white acceptor fabrics. Reactive Red 158 (EMPA 137) and Reactive Black 5 (EMPA 496) are both reactive dyes; Indigo/sulfur black 1 is a particulate dye combination (EMPA 278).

A dE2000 value is calculated comparing results from before and after the test; a higher dE2000 value corresponds to a greater color change, indicating that relatively more dye transferred to the fabric in question.

TABLE 3

| Example | Detergent Composition | Amount of polymer 1D present | Bleeder Fabric | Acceptor Fabric | dE2000 (vs initial) |
|---|---|---|---|---|---|
| 3A | 2A | none | Reactive Red 158 | N/S | 4.3 |
| 3B | 2A | 1.45% | Reactive Red 158 | N/S | 1.2 |
| 3C | 2A | none | Reactive Black 5 | N/S | 1.8 |
| 3D | 2A | 1.45% | Reactive Black 5 | N/S | 0.7 |
| 3E | 2B | none | Indigo/Sulfur Black 1 | Acrylic 871 | 9.79 |
| 3F | 2B | 2.89% | Indigo/Sulfur Black 1 | Acrylic 871 | 0.21 |

N/S = Nylon/spandex test fabric available from WfK, Testgewebe GmbH, Brüggen, Germany
Acrylic 871 available from Test Fabrics, Pittston, PA.

The results in Table 3 show that treatment with a composition that includes a graft copolymer according to the present disclosure leads to lower dE2000 values (i.e., less color change), and therefore likely less dye transfer, compared to treatments with compositions that do not include the graft copolymer.

Example 4. Effect of % Levels of Graft Copolymer on Dye Transfer

To test the effect that the amount of graft copolymer has on dye transfer, detergent compositions are prepared that included varying amounts of graft copolymer.

The midscale dye transfer method is used to assess the amount of dye that has been transferred onto an acceptor fabric during one wash cycle, where a mixture of bleeder dye fabrics are added to a wash load containing acceptor fabrics. The mixture of bleeder dye fabrics included Reactive Red 158, Reactive Black 5, Reactive Brown 7, Reactive Blue 225, and Disperse Blue 79.

A dE2000 is calculated comparing results from before and after the test where a higher dE2000 corresponds to more dye transferred to the fabric.

TABLE 4

| Example | Amount of polymer 1D added to Detergent 2A | Acceptor Fabric | dE2000 (vs initial) |
|---|---|---|---|
| 4A | 0.7% | N/S | 3.3 |
| 4B | 1.2% | N/S | 2.6 |
| 4C | 2.9% | N/S | 1.8 |

N/S = Nylon/Spandex test fabric available from WfK, Testgewebe GmbH, Brüggen, Germany.

Results shown in Table 4 shows that as the concentration of 1D graft copolymer increases, dE2000 decreases, indicating less color change and less dye being transferred onto the nylon/spandex fabric.

Example 5. Graft Copolymer Vs. A Comparative (Nil-VP) Polymer

Example 5 compares the dye control performance of a graft copolymer according to the present disclosure to a comparative polymer. The comparative polymer (Example 1N, above) includes PEG and vinyl acetate, but no vinyl pyrrolidone (VP).

The midscale dye transfer method is used to assess the amount of dye that has been transferred from a bleeder fabric onto an acceptor fabric during one and three wash cycles, where Reactive Red 158 bleeder dye fabrics is added to a wash load containing nylon/spandex acceptor fabrics.

A dE2000 value is calculated comparing results from before and after the test where a higher dE2000 corresponds to more dye transferred to the fabric.

TABLE 5

| Example | Detergent Composition | Polymer added (2%) | dE2000 (Nylon/Spandex) | |
|---|---|---|---|---|
| | | | 1 wash cycle | 3 wash cycles |
| 5A | 2A | none | 6.4 | 10.2 |
| 5B | 2A | 1N (Comp.) | 5.4 | 9.6 |
| 5C | 2A | 1D | 0.9 | 1.7 |
| 5D | 2A | 1M | 1.2 | 2.0 |

Comparative Polymer 1N is a graft copolymer made from 40% by weight PEG, and 60% by weight vinyl acetate.

The results in Table 5 show that the graft copolymer according to the present disclosure, which includes VP and vinyl acetate grafted onto a PEG base, performs better than a polymer that only includes vinyl acetate grafted onto a PEG base. Without wishing to be bound by theory, it is believed that the presence of vinyl pyrrolidone (VP) increases the hydrophilicity of the polymer and interacts with the fugitive dye to better suspend it and prevent the fugitive dye from depositing on the fabric.

Example 6. Effect of Molecular Weight of Polyalkylene Oxide on Dye Control

Example 6 shows the effect that the number average molecular weight of the polyalkylene oxide in the graft copolymer has on dye control performance. In general, it is believed that increasing the molecular weight of the polyalkylene oxide in the graft polymer increases the relative hydrophilicity of the graft polymer.

The midscale dye transfer method is used to assess the amount of dye that has been transferred from Reactive Black 5 bleeder fabrics onto cotton/spandex acceptor fabric after three wash cycles.

TABLE 6

| Example | Detergent Composition | Test Polymer added at 2.9% to Detergent 2B | PEG Molecular Weight (Da) | dE2000 (vs initial) |
|---|---|---|---|---|
| 6A | 2B | 1E | 2000 | 3.9 |
| 6B | 2B | 1D | 4000 | 3.7 |
| 6C | 2B | 1F | 6000 | 3.5 |
| 6D | 2B | 1G | 8000 | 3.5 |

The results in Table 6 show that increasing the molecular weight of the PEG in the graft copolymer from 2000 Da to 6000 Da generally decreases the dE2000 value after three wash cycles, indicating improved performance with regard to dye control. The results in Table 6 also indicate that the dye control performance of the graft polymer remains flat when increasing the molecular weight of the PEG from 6000 Da to 8000 Da.

Example 7. Effect of Vinyl Acetate Levels on Dye Transfer

Example 7 shows the effect that the amount of vinyl acetate (VAc), expressed for example as weight ratio of polyalkylene oxide (e.g., PEG) to vinyl acetate (VAc) in the graft copolymer, has on dye transfer. In general, it is believed that increasing the relative amount of vinyl acetate makes the graft copolymer relatively more hydrophobic.

Various polymers are added to a detergent composition at a polymer level of 2.9%, by weight of the composition. The midscale dye transfer method is used to assess the amount of dye that has been transferred from Reactive Black 5, Reactive Red 158 and Reactive Brown 7 bleeder fabrics onto nylon/spandex acceptor fabric after one wash.

TABLE 7

| Example | Detergent Composition | Test Polymer Added at 2.9% to Detergent | Weight ratio | | | Ratio of PEG to VAc | dE2000 (vs initial) Nylon/spandex |
|---|---|---|---|---|---|---|---|
| | | | PEG | VP | VAc | | |
| Example 7A (Comp.) | 2B | 1P | 1.0 | 1.0 | 3.0 | 0.33 | 1.7 |
| Example 7B (Comp.) | 2B | 1O | 1.0 | 0.7 | 1.7 | 0.59 | 1.6 |
| Example 7C | 2B | 1M | 1.0 | 0.5 | 1.0 | 1.00 | 1.4 |
| Example 7D | 2B | 1D | 1.0 | 0.4 | 0.6 | 1.67 | 1.3 |

The results in Table 7 show that as the weight ratio of PEG to vinyl acetate increases (i.e., as the relative amount of vinyl acetate decreases), the dE2000 values decrease, indicating less color change and improved dye control performance. Specifically, Example 7D, which included the graft copolymer with the highest PEG:VAc weight ratio (and VAc present in the lowest weight %), provided the best dye control performance. Without wishing to be bound by theory, it is believed that graft copolymers with relatively greater levels of vinyl acetate are more hydrophobic, negatively impacting their dye control performance on hydrolyzed reactive dyes because they are less effective at suspending dyes.

Example 8. Effect of Vinyl Acetate Hydrolysis

Example 8 shows the effect of vinyl acetate hydrolysis on dye transfer. In general, it is believed that as the degree of hydrolysis increases, the hydrophobicity of the polymer decreases.

The midscale dye transfer method is used to assess the amount of dye that has been transferred from Reactive Black 5 bleeder fabrics onto 100% cotton acceptor fabric after three wash cycles.

TABLE 8

| Example | Detergent Composition | Test Polymer Added at 2.9% to Detergent | Vinyl Acetate Hydrolysis (mol %) | dE2000 (vs initial 100% Cotton) after 3 cycles |
|---|---|---|---|---|
| 8A | 2B | 1F | 0% | 4.0 |
| 8B | 2B | 1J | 20% | 3.8 |
| 8C | 2B | 1K | 40% | 3.4 |

As shown in Table 8, as the degree of vinyl acetate hydrolysis increases for the polymers tested, the dE2000 values decrease, indicating less color change, less dye transfer, and a more efficient dye control polymer.

Example 9. Combination of Graft Copolymer with Protease Enzyme

Example 9 shows the effect of the graft copolymers according to the present disclosure in combination with protease enzymes in relation to dye transfer onto certain fabric types. In particular, multi-fiber fabric swatches are treated with compositions that include protease enzyme, a graft copolymer according to the present disclosure, and a combination thereof.

The midscale dye transfer method is used to assess the amount of dye that is transferred from Indigo/Sulfur Black 1 bleeder fabrics onto multi-fiber fabric ("MFF") swatches. The MFF swatches (obtained from Test Fabrics, Pittston, Pa.; model #49) include a variety of fiber types in adjacent strips.

In the present test, the portion containing acrylic fibers showed the biggest change with regard to color differences and dye transfer. The dye transfer results for the acrylic fiber portion of the MFF swatches are shown below in Table 9. Results for each are assessed visually for a color change, and for Examples 9B and 9C, using the dE2000 test method.

TABLE 9

| Example | Detergent | Test Polymer 1D Added | Protease Enzyme | Visual Assessment: dye transfer onto acrylic fibers? | dE2000 |
|---|---|---|---|---|---|
| 9A | 2B | none | 0.056% | Yes | (not measured) |
| 9B | 2B | 2.9% | none | Yes | 7.2 |
| 9C | 2B | 2.9% | 0.056% | No | 0.6 |

The results in Table 9 show that the combination of protease enzyme and a graft polymer according to the present disclosure decrease dye transfer onto the acrylic fiber portion of the MFF swatch.

To note, the same pattern (e.g., the significance of protease) was not observed with regard to a different acrylic fabric (for example, Acrylic 871, available from Test Fabrics, W. Pittston, Pa.), where the presently disclosed copolymer was sufficient to deliver a dye control benefit, even absent protease. This indicates that the copolymer/protease combination will be particularly effective when used to treat certain fiber types from certain manufacturers and/or having certain fiber finishes, and therefore useful in the mixed loads of the modern consumer.

Example 10. Physical Phase Stability

Example 10 tests for physical phase stability upon storage. Two samples of a liquid laundry detergent (Example 2E) that include a graft polymer according to the present disclosure (Example 1D) are provided. It is believed that the graft polymer included about one or fewer graft sites per fifty ethyleneoxy groups in the graft base.

An exemplary structurant (0.32% hydrogenated castor oil) is provided to one of the samples (Example 10B). The samples are stored for four days at ambient temperature.

After storage, the samples are visually assessed for phase stability and/or separation (such as a clear layer on the bottom of the container). No visible separation indicates that the sample is phase stable. The results are recorded in Table 10.

TABLE 10

| Example | Detergent | Amount polymer 1D added to detergent | Structurant present? | Stable after storage? |
|---|---|---|---|---|
| 10A | 2E | 1.7% | No | No |
| 10B | 2E | 1.7% | Yes | Yes |

The results shown in Table 10 indicate that a structurant can help to provide physical phase stability in compositions that include the graft copolymer. Without wishing to be bound by theory, it is believed that the relatively low number of graft sites in the polymer contribute to making the copolymer relatively hydrophobic. The structurant may help to suspend the hydrophobic material.

Example 11. Effect of Graft Copolymer on Deposition of Other Actives

Besides controlling fugitive dye transfer, detergents may also need to deposit other actives such as a hueing agent, which tend to increase the whiteness of fabrics. To test the impact of the polymers of the present disclosure on the efficacy of hueing agents, various fabrics are pre-conditioned and washed in one cycle with a liquid detergent that includes hueing agent and, for some samples, a graft copolymer according to the present disclosure.

To note, two different classes of hueing agents are tested. Hueing Agent 1 is Leuco Crystal Violet (available from Sigma-Aldrich), a dye that falls within the triphenylmethane chemical class. Hueing Agent 2 (obtained from Milliken) is a dye that falls within the azo chemical class.

After treatment, the fabrics are assessed for whiteness using the WI/CIE test method described above and compared to a control treated with a composition that included neither hueing agent nor graft copolymer 1E. Results are shown in Table 11; greater WI scores indicate increased whiteness and improved performance, and the number in parenthesis shows the whiteness improvement relative to the control.

TABLE 11

| | Amount | | WI (CIE) | |
|---|---|---|---|---|
| Example | 0.2% Hueing Agent | Polymer 1D added to Detergent 2E | Pre-conditioned Cotton Knit Fabric | Pre-conditioned Poly-Cotton Fabric |
| 11A (control) | none | none | 6.5 | 4.8 |
| 11B | Hueing Agent 1 | none | 9.7 (+3.2) | 6.2 (+1.4) |
| 11C | Hueing Agent 1 | 2.2% | 9.6 (+3.1) | 6.0 (+1.2) |
| 11D | Hueing Agent 2 | none | 8.2 (+1.7) | 5.3 (+0.5) |
| 11E | Hueing Agent 2 | 2.2% | 8.3 (+1.8) | 5.7 (+0.9) |

The results in Table 11 show that the addition of hueing agent to the detergent composition improves the whiteness of pre-conditioned cotton and poly/cotton knit test fabrics when washed with soil according to an increase in whiteness index with hue dye (see Examples 11B and 11D, compared to control Example 11A). Furthermore, addition of graft copolymer 1D has little effect on the deposition and/or performance of the hueing dyes, as evidenced by the whiteness index being substantially the same with or without the graft copolymer (compare Examples 11B and 11C, and Examples 11D and 11E). This indicates that the graft copolymers according to the present disclosure are surprisingly selective in the types of dye that they sequester; in other words, the copolymers appear to sequester and inhibit transfer of fugitive dyes that escape from fabrics, while allowing hueing dyes to deposit as intended by the detergent manufacturer.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A composition comprising a graft copolymer, and a treatment adjunct,
   the graft copolymer comprising
   (a) a polyalkylene oxide which has a number average molecular weight of from
     about 1000 to about 20,000 Daltons and is based on ethylene oxide, propylene oxide, or butylene oxide,
   (b) N-vinylpyrrolidone, and
   (c) vinyl ester derived from a saturated monocarboxylic acid containing from 1 to
     6 carbon atoms and/or a methyl or ethyl ester of acrylic or methacrylic acid,
   wherein the weight ratio by weight of the polymer of (a):(b) is from about 1:0.3 to about 1:1,
   wherein the amount, by weight of the polymer, of (a) is greater than the amount of (c),
   and
   wherein the composition is a fabric care composition.

2. A composition according to claim 1, wherein the polyalkylene oxide is based on ethylene oxide.

3. A composition according to claim 1, wherein the polyalkylene oxide has a number average molecular weight of from about 2000 to about 15,000 Daltons.

4. A composition according to claim 1, wherein the vinyl ester is derived from a saturated monocarboxylic acid containing from 1 to 3 carbon atoms.

5. A composition according to claim 1, wherein the vinyl ester is vinyl acetate or a derivative thereof.

6. A composition according to claim 1, wherein the weight ratio of (a):(b) is from about 1:0.2 to about 1:0.7.

7. A composition according to claim 1, wherein the weight ratio of (a):(c) is from about 1:0.1 to about 1:0.8.

8. A composition according to claim 1, wherein the weight ratio of (b):(c) is from about 1:0.1 to about 1:4.

9. A composition according to claim 1, wherein from about 1 mol % to about 60 mol % of component (c) is hydrolyzed.

10. A composition according to claim 1, wherein the number of grafting sites of the graft polymer is equal to or less than about 1 per 50 ethylene oxide groups.

11. A composition according to claim 1, wherein the composition comprises from about 0.1% to about 15%, by weight of the composition, of the graft copolymer.

12. A composition according to claim 1, wherein the treatment adjunct is selected from the group consisting of a surfactant system, fatty acids and/or salts thereof, enzymes, encapsulated benefit agents, soil release polymers, hueing agents, builders, chelating agents, dye transfer inhibiting agents, dispersants, enzyme stabilizers, catalytic materials, bleaching agents, bleach catalysts, bleach activators, polymeric dispersing agents, soil removal/anti-redeposition agents, polymeric grease cleaning agents, amphiphilic copolymers, brighteners, suds suppressors, dyes, perfume, structure elasticizing agents, fabric softeners, carriers, fillers, hydrotropes, solvents, anti-microbial agents and/or preservatives, neutralizers and/or pH adjusting agents, processing aids, rheology modifiers and/or structurants, opacifiers, pearlescent agents, pigments, anti-corrosion and/or anti-tarnishing agents, and mixtures thereof.

13. A composition according to claim 1, wherein the treatment adjunct comprises a hueing agent is selected from an azo agent, a triarylmethane agent, a triphenylmethane agent, or mixtures thereof.

14. A composition according to claim 1, wherein the treatment adjunct comprises a protease enzyme.

15. A composition according to claim 1, the composition further comprising a structurant.

16. A composition according to claim 1, wherein the composition comprises from about 1% to about 70%, by weight of the composition, of a surfactant system comprising anionic surfactant, nonionic surfactant, amphoteric surfactant, zwitterionic surfactant, or combinations thereof.

17. A composition according to claim 1, wherein the composition further comprises a polymer selected from the group consisting of: an amphiphilic copolymer that is free of vinyl pyrrolidone; polyvinyl pyrrolidone (PVP); poly(vinylpyrine-N-oxide) (PVNO); polyvinylpyrrolidone-co-polyvinylimidazole (PVP/PVI); poly(vinylpyrrolidone)co-poly(vinylpyridine-N-oxide) (PVP/PVNO); or mixtures thereof.

18. A composition according to claim 1, wherein the composition is in the form of a liquid composition, a granular composition, a single-compartment pouch, a multi-compartment pouch, a sheet, a pastille or bead, a fibrous article, a tablet, a bar, flake, or a mixture thereof.

19. A process of treating a fabric, the process comprising the steps of:
   providing a fabric, and
   contacting the fabric with a composition according to claim 1, optionally in the presence of water.

20. A process according to claim 19, wherein the fabric is a first fabric portion that is part of a laundry load, the laundry load comprising a second fabric portion that comprises a colorant.

21. A process according to claim 20, wherein the colorant comprises a reactive dye or hydrolyzed product thereof.

22. A process according to claim 20, wherein the first fabric portion is part of a first article or garment, and wherein the second fabric portion is part of a second article or garment.

* * * * *